United States Patent
Sasaki

Patent Number: 5,741,078
Date of Patent: Apr. 21, 1998

[54] LINEAR BALL BEARING WITH SOLID LUBRICATING FILM

[75] Inventor: Akira Sasaki, Kawasaki, Japan

[73] Assignee: Kabushiki Kaisha Toshiba, Kawasaki, Japan

[21] Appl. No.: 709,844

[22] Filed: Sep. 10, 1996

[30] Foreign Application Priority Data

Sep. 13, 1995 [JP] Japan ............... 7-235353

[51] Int. Cl.$^6$ .......................... F16C 29/06
[52] U.S. Cl. ................. 384/43; 384/13; 384/902
[58] Field of Search .................. 384/45, 43, 13, 384/463, 902, 491, 492

[56] References Cited

U.S. PATENT DOCUMENTS

| | | | |
|---|---|---|---|
| 2,969,264 | 1/1961 | Lamson et al. | 384/463 |
| 3,001,838 | 9/1961 | Lamson et al. | 384/463 |
| 3,198,735 | 8/1965 | Lamson et al. | 384/463 |
| 4,328,999 | 5/1982 | Olschewski et al. | 384/43 |
| 4,797,011 | 1/1989 | Saeki et al. | 384/13 |
| 4,923,761 | 5/1990 | Shindo | 384/463 X |

FOREIGN PATENT DOCUMENTS

| | | |
|---|---|---|
| 4-302709 | 10/1992 | Japan . |
| 5-126150 | 5/1993 | Japan .............. 384/13 |

OTHER PUBLICATIONS

Catalogue No. 1171, NTN Corporation, Nov. 11, 1989.

Japanese Abstract, JP 57 200726 A, Ishikawajima Harima Jukogyo KK, Dec. 9, 1982.

Japanese Abstract, JP 05 126150 A, Kondo Hiromitsu, May 21, 1993.

Japanese Abstract, JP 06 129437 A, Isono Jun., May 10, 1994.

*Primary Examiner*—Thomas R. Hannon
*Attorney, Agent, or Firm*—Oblon, Spivak, McClelland, Maier & Neustadt, P.C.

[57] ABSTRACT

A linear ball bearing comprises a holder and an outer casing each made of a metallic material. A solid lubricating film is formed to cover both the inner surface of a ball guide groove formed in the holder and the inner surface of the outer casing. An oxalate film is formed to cover the surfaces of a plurality of balls each made of a metallic material to provide porous surface regions of the balls. While the balls are moved along the ball guide groove, the lubricant forming the solid lubricating film is transferred from the solid lubricating film onto the balls to achieve a desired lubrication.

8 Claims, 1 Drawing Sheet

LINEAR BALL BEARING WITH SOLID LUBRICATING FILM

BACKGROUND OF THE INVENTION

1. Field of the Invention

The present invention relates to a linear ball bearing adapted for use in an equipment for an extreme environment such as a cosmic space or vacuum environment.

2. Description of the Related Art

As known well, it is difficult to use an oil or grease for lubrication in a cosmic space because the cosmic space provides a thermal vacuum environment. Therefore, a solid lubricating system using a solid lubricant such as molybdenum disulfide ($MoS_2$) is employed in a linear ball bearing in various driving mechanisms included in, for example, a space station.

A known linear ball bearing comprises a cylindrical holder including ball guide grooves each forming a closed loop. These guide grooves are formed within the wall of the holder in a formation to extend in an axial direction of the holder. A through-hole fitting with the inner space of the cylindrical holder and extending in an axial direction is formed in a part of each ball guide groove. The cylindrical holder is inserted into an cylindrical outer casing. Also, a core element is inserted movable relative to the holder in the axial direction into the holder such that the balls positioned in the through-hole are in direct contact with the core element. When the outer casing is urged to move in the axial direction, the balls are moved along the ball guide groove. When moved along the through-hole included in the ball guide groove, the balls are allowed to slide along the core member to permit the core member to be moved linearly, as desired.

In the conventional solid lubricating system for the linear ball bearing outlined above, a solid lubricating film is formed to cover the surfaces of the ball guide groove formed within the cylindrical holder, the ball-sliding portion of the outer casing, and the surface of balls by, for example, the sputtering method, plating method, or ion plating method. Alternatively, a solid lubricating film is formed by coating. In this case, the lubricant forming the coated lubricating film is transferred onto the balls.

In the former case utilizing the sputtering method, etc., the solid lubricating film can be formed relatively thin, leading to the merit that it is possible to diminish the clearance formed by the linear movement of the balls between the ball and the ball-sliding portion. However, the absolute amount of the solid lubricating film contributing to the lubrication is small in this solid lubricating system, giving rise to the problem that the life of the linear ball bearing is shortened. In the latter case utilizing the coating method, the solid lubricating film is formed relatively thick. As a result, the solid lubricating film tends to be easily abraded, giving rise to generation of a powdery material accompanying the abrasion. In this case, a clearance causing backlash is generated, leading to a short life of the linear ball bearing.

As described above, the absolute amount of the solid lubricating film is insufficient, or a powdery material accompanying abrasion of the solid lubricating film is likely to be generated, in the conventional linear ball bearing, leading to a short life of the bearing. Naturally, the conventional linear ball bearing is not satisfactory when used in an extreme environment such as a cosmic space in which it is difficult to perform the maintenance and inspection of the bearing.

In addition, where the size of the linear ball bearing is on the order of millimeters, the diameter of the ball is much smaller than one millimeter. It follows that it is difficult to form a solid lubricating film of a predetermined thickness to cover the outer surface of the ball in the conventional solid lubricating system.

The above-noted difficulties inherent in the linear ball bearing used in a cosmic space are also inherent in the linear ball bearing used under vacuum on the ground.

SUMMARY OF THE INVENTION

An object of the present invention is to provide a linear ball bearing of a simpler construction and a longer life, which permits promoting miniaturization of the bearing and also permits achieving lubrication of a high precision over a long period of time.

According to the present invention, there is provided a linear ball bearing, comprising:

a plurality of metallic balls each having a porous region formed on at least a surface region, said balls being rotatable to slide along one of a stationary element and a linearly movable element;

a holder made of a metallic material and having a plurality of ball guide grooves formed therein such that each of said ball guide grooves forms a closed loop to permit said balls to be circulated along the ball guide groove, said ball guide grooves being positioned to face one of said stationary element and said linearly movable element, a solid lubricating film being formed to cover at least the inner surface of said ball guide groove, and a plurality of said balls being housed in each of said ball guide grooves; and an outer casing made of a metallic material and having said holder inserted thereinto, a solid lubricating film being formed to cover ball-sliding portions facing said ball guide grooves, and said outer casing constituting the other of said stationary element the linearly movable element.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawing, which is incorporated in and constitutes a part of the specification, illustrates presently preferred embodiments of the invention and, together with the general description given above and the detailed description of the preferred embodiments given below, serves to explain the principle of the invention.

DETAILED DESCRIPTION OF THE PREFERRED EMBODIMENTS

Figure 1:
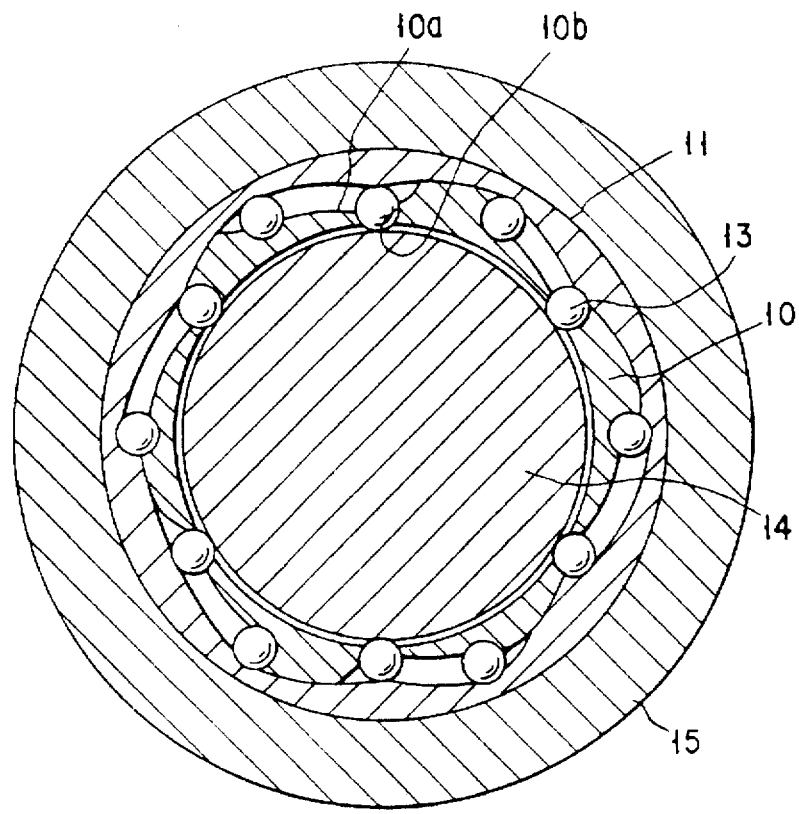
FIG. 1 is a cross sectional view showing a linear ball bearing according to one embodiment of the present invention.
Figure 2:
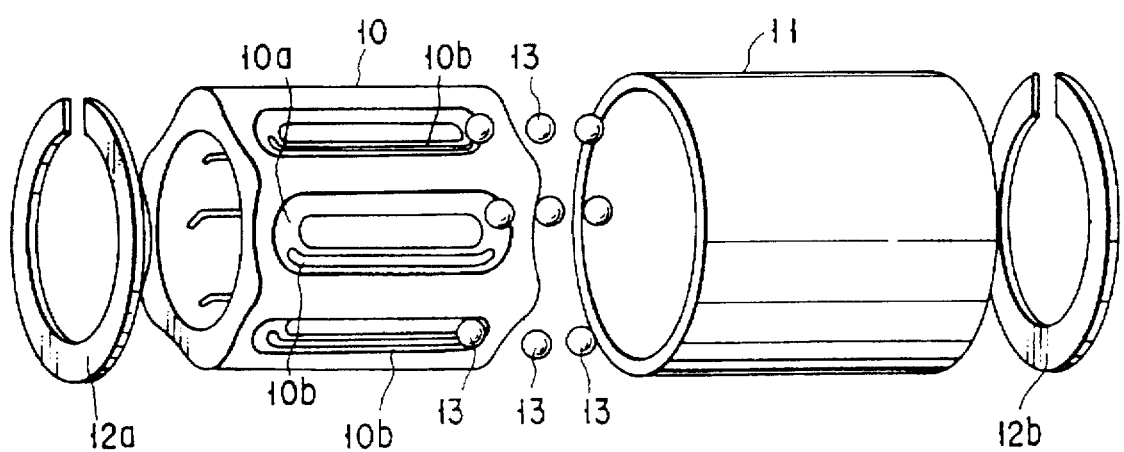
FIG. 2 is an oblique view showing the dismantled state of the linear ball bearing shown in FIG. 1.

FIGS. 1 and 2 collectively show a linear ball bearing according to one embodiment of the present invention. As shown in FIG. 1, the bearing comprises a cylindrical holder 10 which is inserted into a cylindrical outer casing 11. The holder 10 inserted into the outer casing 11 is held between stopper rings 12a and 12b, as shown in FIG. 2.

A plurality of ball guide grooves 10a each forming a closed loop are formed a predetermined distance apart from each other within the wall of the holder 10. A through-hole 10b fitting with the inner space of the holder 10 is formed in a part of each of these ball guide grooves 10a, as shown in FIG. 2. The holder 10 is inserted into the outer casing 11 such that a plurality of balls 13 housed in the groove 10a are interposed between the groove 10a and the inner surface of the outer casing 11. Further, a core element 14 is movably inserted into the inner space of the holder 10. What should be noted is that the balls 13 running along the through-hole 10b within the ball guide groove 10a are rotated and slid along the outer surface of the core element 14.

Each of the holder 10 and the outer casing 11 is made of a metallic material such as a bearing steel, stainless steel, heat-resistant steel, alloy tool steel, or high-speed steel. It should be noted that a solid lubricating film is formed to cover at least the inner surfaces of ball guide groove 10a of the holder 10 and at least the ball-sliding portions in the inner surface of the outer casing 11. The solid lubricating film is selected from the group consisting of, for example, a molybdenum disulfide ($MoS_2$) film formed by a sputtering method, an Au film, Ag film and Pb film formed by an ion plating method, and a molybdenum disulfide film formed by a coating method.

The ball 13 is also made of a metallic material such as a bearing steel, stainless steel, heat-resistant steel, alloy tool steel, or high-speed steel. It should be noted that a treatment with an oxalate is applied to the surface of the ball 13 to make the surface region of the ball 13 porous. As a result, a lubricant is transferred from the solid lubricating film formed to cover the surfaces of the ball guide groove 10a and the inner surface of the outer casing 11 into the porous surface region of the ball 13 while the balls are circulated within the ball guide groove 10 forming a closed loop.

The cylindrical outer casing 11 is fixed to a movable body 15 movable in the axial direction. On the other hand, the core element 14, which is stationary, is movably inserted into the holder 10. It follows that, if the outer casing 11 is urged via the movable body 15 to be moved in the axial direction, the balls 13 within the ball guide groove 10a included in the holder 10 are circulated within the ball guide groove 10a forming a closed loop.

As described previously, the balls 13 positioned within the through-hole 10b of the ball guide groove 10a are allowed to slide along and in the axial direction of the outer surface of the core element 14 while the balls 13 are circulated within the groove 10a. Likewise, the balls 13 positioned in another region of the groove 10a are allowed to slide along the inner surface of the outer casing 11 during circulation of the balls 13 within the groove 10a, as apparent from FIG. 1. It follows that the lubricant in the solid lubricating film formed to cover the inner surfaces of the ball guide grooves 10a and the inner surface of the outer casing 11 is transferred into the porous surface regions of the balls 13. At the same time, the holder 10 and the outer casing 11 are linearly moved via the balls 13 along the core element 14. It follows that the movable body 15 fixed to the outer casing 11 is guided in the axial direction.

To reiterate, each of the holder 10 and the outer casing 11 included in the linear ball bearing of the present invention is made of a metallic material. Also, a solid lubricating film is formed to cover the inner surfaces of the ball guide grooves 10a formed in the holder 10 and to cover selectively the inner surface of the outer casing 11. Further, a treatment with an oxalate is applied to the surface of the ball 13 made of a metallic material to make the surface region of the ball 13 porous.

The particular construction permits the balls 13 to be moved along the ball guide groove 10a formed in the holder 10. What should be noted is that, during the movement of the ball 13, the porous surface region of the ball 13 is brought into contact with the solid lubricating film covering the surface of the ball guide groove 10a and with the solid lubricating film formed to cover selectively the inner surface of the outer casing 11, with the result that the lubricant forming the solid lubricating film is transferred into the surface region of the ball 13. It follows that it is possible to decrease the thickness of the solid lubricating film formed at the beginning, making it possible to diminish the clearance formed by abrasion of the solid lubricating film between the members of the linear ball bearing. In addition, it is possible to achieve lubrication of a high accuracy, which permits diminishing the amount of the powdery material accompanying the abrasion. Naturally, the linear ball bearing can be operated with a high accuracy over a long period of time, leading to a long life of the bearing.

It should also be noted that linear ball bearings on the order of millimeters are strongly required in the field of, for example, a space developing program. In this case, the ball 13 is required to be much smaller than 1 millimeter in diameter. However, the technical idea of the present invention makes it possible to manufacture the balls 13 of such a small size with a high precision. It follows that the present invention permits miniaturizing the linear ball bearing without difficulty.

The technical idea of the present invention can be applied to linear ball bearings of various types such as a clearance adjusting type and an open type, with substantially the same effects.

Also, in the embodiment shown in the accompanying drawings, a treatment with an oxalate was applied to the ball 13 to make the surface region of the ball 13 porous. Alternatively, it is possible to apply a treatment with a phosphate or a nitrate to form a phosphate film or a nitrate film to cover the surface of the ball 13. Further, additional treatments can be applied to the ball 13 to make the surface region of the ball 13 porous.

Further, in the embodiment shown in the accompanying drawings, the outer casing 11 is moved in the axial direction, with the core element 14 held stationary. However, it is also possible to make the core element 14 movable in the axial direction, with the outer casing 11 held stationary.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalents.

What is claimed is:

1. A linear ball bearing, comprising:
   a holder movably mounted to a stationary element and having a plurality of ball guide grooves formed therein a predetermined distance apart from each other such that each of said guide grooves forms a closed loop to face said stationary element, said guide groove being coated with a solid lubricating film;
   an outer casing linearly movable relative to said stationary element, mounted to a movable element, and provided with a plurality of ball-sliding portions facing said ball guide grooves and coated with a solid lubricating film, said holder being inserted into said outer casing; and a plurality of balls slidably interposed between the ball guide grooves formed in the holder and the ball-sliding portions of the outer casing, at least the surface region of said ball being porous, said balls being rolled in an interlocking fashion with the linear movement of said movable element such that some of the balls partly project out of the ball guide grooves so as to slide along the stationary element, and the solid lubricating films within the ball guide groove and in the ball sliding portion being transferred onto the porous surface region of the ball during the rolling of the ball.

2. The linear ball bearing according to claim 1, wherein an oxalate film is formed to cover the surface of said ball to provide said porous surface region.

3. The linear ball bearing according to claim 1, wherein a phosphate film is formed to cover the surface of said ball to provide said porous surface region.

4. The linear ball bearing according to claim 1, wherein a nitrate film is formed to cover the surface of said ball to provide said porous surface region.

5. A linear ball bearing, comprising:

a holder mounted to a movable element which can be linearly moved relative to a stationary element and having a plurality of ball-sliding portions formed a predetermined distance apart from each other to face a stationary element such that each of said ball-sliding portions is coated with a solid lubricating film;

an outer casing movably mounted to said stationary element, and provided with a plurality of ball guide grooves arranged such that each of said grooves forms a closed loop, facing said ball-sliding portions, and coated with a solid lubricating film, said holder being inserted into said outer casing; and a plurality of balls slidably interposed between the ball-sliding portions formed in the holder and the ball guide grooves of the outer casing, at least the surface region of said ball being porous, said balls being rolled in an interlocking fashion with the linear movement of said movable element such that some of the balls partly project out of the ball guide grooves so as to slide along the stationary element, and the solid lubricating films within the ball guide groove and in the ball sliding portion being transferred onto the porous surface region of the ball during the rolling of the ball.

6. The linear ball bearing according to claim 5, wherein an oxalate film is formed to cover the surface of said ball to provide said porous surface region.

7. The linear ball bearing according to claim 5, wherein a phosphate film is formed to cover the surface of said ball to provide said porous surface region.

8. The linear ball bearing according to claim 5, wherein a nitrate film is formed to cover the surface of said ball to provide said porous surface region.

* * * * *